(12) United States Patent
Henry et al.

(10) Patent No.: US 10,605,272 B2
(45) Date of Patent: Mar. 31, 2020

(54) LOCKING SEAT PIVOT BALL SIPHON ELBOW

(71) Applicant: KADANT JOHNSON LLC, Three Rivers, MI (US)

(72) Inventors: Timothy N. Henry, Marcellus, MI (US); Eugene F. Sibley, Marcellus, MI (US)

(73) Assignee: Kadant Johnnson Inc., Three Rivers, MI (US)

( * ) Notice: Subject to any disclaimer, the term of this patent is extended or adjusted under 35 U.S.C. 154(b) by 248 days.

(21) Appl. No.: 15/606,541

(22) Filed: May 26, 2017

(65) Prior Publication Data

US 2017/0343018 A1 Nov. 30, 2017

Related U.S. Application Data (60) Provisional application No. 62/341,763, filed on May 26, 2016.

(51) Int. Cl.
| | |
|---|---|
| *F16L 27/04* | (2006.01) |
| *F04F 10/00* | (2006.01) |
| *D21F 5/10* | (2006.01) |
| *F26B 13/18* | (2006.01) |
| *F26B 25/20* | (2006.01) |
| *B23P 19/00* | (2006.01) |
| *F16L 27/08* | (2006.01) |

(52) U.S. Cl.
CPC ............. *F04F 10/00* (2013.01); *B23P 19/00* (2013.01); *D21F 5/10* (2013.01); *F16L 27/04* (2013.01); *F16L 27/0841* (2013.01); *F26B 13/18* (2013.01); *F26B 13/183* (2013.01); *F26B 25/20* (2013.01)

(58) Field of Classification Search
CPC .......... F16L 27/04; F16L 27/0853; D21F 5/10
USPC ...... 285/268, 269, 262, 282; 34/125; 165/90
See application file for complete search history.

(56) References Cited

U.S. PATENT DOCUMENTS

| | | | | |
|---|---|---|---|---|
| 2,000,087 A | * | 5/1935 | Meeker | ..................... D21F 5/10 285/283 |
| 2,170,963 A | * | 8/1939 | Gosta | ........................ A47L 9/02 285/262 |

(Continued)

FOREIGN PATENT DOCUMENTS

EP 2 017 517 A1 1/2009

*Primary Examiner* — David Bochna
(74) *Attorney, Agent, or Firm* — Young Basile Hanlon & MacFarlane, P.C.

(57) ABSTRACT

A siphon elbow for pivotally connecting a first pipe and a second pipe in fluid communication. A first elongated body has a bore extending therethrough and a partially spherical indentation within the bore. A second elongated body has a bore extending therethrough and a generally spherical extension on a first end that pivotally engages the partially spherical indentation of the first elongated body. An internal locking system is disposed in at least one of the bores and locks the second elongated body into an operating configuration in which an angle formed between the first elongated body and the second elongated body is less than 180-degrees. Pivoting of the second elongated body from an installation configuration in which the angle is approximately 180-degrees to the operating configuration activates the internal locking system.

20 Claims, 4 Drawing Sheets

(56) References Cited

U.S. PATENT DOCUMENTS

| | | | | |
|---|---|---|---|---|
| 2,299,530 | A | * | 10/1942 | Cram .................. D21F 5/10 |
| | | | | 29/240 |
| 2,732,228 | A | | 1/1956 | Armstrong |
| 2,875,527 | A | * | 3/1959 | Daane .................. F28F 5/02 |
| | | | | 34/124 |
| 2,934,831 | A | | 5/1960 | Tasker |
| 2,978,815 | A | * | 4/1961 | Hieronymus .......... F16L 39/04 |
| | | | | 34/125 |
| 3,473,237 | A | * | 10/1969 | McCourt ............. F26B 13/183 |
| | | | | 165/89 |
| 3,948,283 | A | | 4/1976 | Asfura et al. |
| 4,590,688 | A | | 5/1986 | Steffero, Sr. |
| 4,691,452 | A | * | 9/1987 | Ferguson .............. F28F 5/02 |
| | | | | 34/119 |
| 5,533,569 | A | * | 7/1996 | Reibel .................. D21F 5/10 |
| | | | | 165/90 |
| 6,203,072 | B1 | | 3/2001 | Berghuis et al. |
| 7,018,513 | B2 | | 3/2006 | Smith |
| 7,618,068 | B2 | | 11/2009 | Henry et al. |

\* cited by examiner

LOCKING SEAT PIVOT BALL SIPHON ELBOW

CROSS-REFERENCE TO RELATED APPLICATION

This application claims the benefit of U.S. Provisional Application Ser. No. 62/341,763, filed on May 26, 2016.

TECHNICAL FIELD

This disclosure relates generally to a siphon elbow used to connect two pipes in fluid communication, and more particularly, to a siphon elbow having a pivoting portion that is automatically locked into an angled, operating configuration by an internal locking system without use of an external tool.

BACKGROUND

Papermaking machines typically include three main sections: forming, pressing and drying. The raw material, called furnish, is largely water and is converted to sheet form in these three sections. The first section, forming, uses vacuum and other means to remove most of the water. At the same time, the fibers of the sheet are formed into the desired mat. The second section, pressing, removes more water by pressing the sheet between felted rolls. The final section, drying, uses rotating heat transfer drums, also called dryers. These dryers are heated by a heat transfer medium, typically steam. A dryer section usually includes many such dryers arranged in single or multiple tiers. The sheet is threaded through the arrangement of dryers, being heated by the rotating dryers so that most or all of the remaining water is evaporated from the sheet.

Steam introduced into each dryers' cylinder condenses as it cools, and the condensate collects on the inside wall of the cylinder. A siphon assembly can be employed to remove this condensate. The siphon assembly essentially defines a condensate outlet conduit extending from an inlet end positioned close to the interior surface of the cylinder's inside wall, through and out the dryer's journal and to fixed piping beyond.

To allow the siphon assembly to be inserted into a dryer's cylinder through the narrow passageway defined in the journal and still have the end of the siphon assembly positioned close to the inside surface of the dryer cylinder, siphon assemblies typically comprise three main components: a horizontal siphon pipe, so named because it is oriented generally horizontally within the dryer, a vertical siphon pipe, so named because, when deployed in the dryer, it extends at an angle in the vertical plane defined relative to the horizontal siphon pipe, and a siphon elbow which interconnects the two siphon pipes in fluid communication. The siphon elbow is generally comprised of fixed and pivoting components. The pivoting components allow the vertical siphon pipe to be selectively pivoted between a first configuration, where the pivoting component is longitudinally aligned with the horizontal siphon pipe so that the siphon assembly can be passed through the passageway in the dryer's journal, and a second configuration, where the vertical siphon pipe is oriented at an angle relative to the horizontal siphon pipe so that the inlet end is disposed closer to the dryer cylinder's interior surface.

SUMMARY

Siphon elbows for pivotally connecting a first pipe and a second pipe in fluid communication and related methods are disclosed. In one implementation, the siphon elbow comprises a first elongated body, a second elongated body, and an internal locking system. The first elongated body has a bore extending therethrough. An inner surface defines the bore of the first elongated body, and a portion of the inner surface has a partially spherical indentation. The second elongated body has a bore extending therethrough and a generally spherical extension on a first end that pivotally engages the portion of the inner surface of the first elongated body that has the partially spherical indentation. The internal locking system is disposed in at least one of the bore of the first elongated body or the second elongated body and locks the second elongated body into an operating configuration in which an angle formed between the first elongated body and the second elongated body is less than 180-degrees. Pivoting of the second elongated body from an installation configuration in which the angle is approximately 180-degrees to the operating configuration activates the internal locking system.

The second elongated body and the generally spherical extension can be integrally formed. The first pipe can be connected to an outer surface of the second elongated body, and the second pipe can be connected to the inner surface of the first elongated body. The first pipe can rest against a shoulder formed in the outer surface of the second elongated body opposite the generally spherical extension. The second elongated body can rest within a recess that is formed along an end of the first elongated body when the second elongated body is locked in the operating configuration. The internal locking system can comprise a locking retainer having a bore that extends therethrough and a first end configured to matingly engage the first end of the second elongated body. A fluid communication channel can be formed through the first pipe, the first elongated body, the second elongated body, the locking retainer, and the second pipe.

The internal locking system can further include a spring that biases the locking retainer toward the second elongated body. A first end of the spring can engage a shoulder formed along the bore of the locking retainer. The internal locking system can further include a spring seat having a bore extending therethrough and a shoulder formed along the bore. A second end of the spring can engage the shoulder of the spring seat. The spring seat, the spring, and the locking retainer can be disposed within the bore of the first elongated body. A fluid communication channel can be formed through the first pipe, the first elongated body, the second elongated body, the locking retainer, the spring, the spring seat, and the second pipe. The first end of the locking retainer can have a chamfer extending along a circumference. The first end of the second elongated body can have a chamfer extending along a circumference of the generally spherical extension. The internal locking system can lock the second elongated body into the operating configuration without use of a tool external to the siphon elbow, the first pipe, and the second pipe.

In another implementation, the siphon elbow comprises a first elongated body, a second elongated body, a locking retainer, and a spring. The first elongated body has a bore extending therethrough and a recess formed along an end of the first elongated body. An inner surface defines the bore of the first elongated body and a portion of the inner surface has a partially spherical indentation. The second elongated body has a bore extending therethrough and a generally spherical extension on a first end that pivotally engages the portion of the inner surface of the first elongated body that has the partially spherical indentation. The second elongated body pivots into the recess of the first elongated body in a locked configuration, where the first pipe is angled relative to the second pipe. The locking retainer is within the first elongated body and has a first end configured to matingly engage a second end of the second elongated body and a bore extending therethrough. The spring is within the first elongated body and biases the locking retainer toward the second elongated body. The spring and the locking retainer cooperate to lock the second elongated body in the locked configuration once the siphon elbow has pivoted from a substantially straight configuration into the locked configuration.

The second elongated body and the generally spherical extension can be integrally formed. The first pipe can be connected to an outer surface of the second elongated body opposite the generally spherical extension. The first end of the second elongated body can have a chamfer with a substantially frusto-conical configuration that slides along a chamfer with a substantially frusto-conical configuration on the first end of the locking retainer.

In yet another implementation, a method of installing a siphon assembly into a cylinder through an internal passageway includes providing the siphon assembly with a first pipe and a second pipe connected to and in fluid communication with a siphon elbow. The siphon elbow has a first configuration, where the siphon assembly is substantially straight, and a second configuration, where the siphon assembly is bent. The method also includes inserting the siphon assembly in the first configuration into the cylinder through the internal passageway until at least the first pipe has cleared the internal passageway and the second pipe is at least partially within the internal passageway. The method further includes rotating the siphon assembly until the first pipe moves into the second configuration. An internal locking system within the siphon elbow locks the siphon elbow into the second configuration once the siphon elbow transitions into the second configuration from the first configuration.

The internal locking system can lock the siphon elbow into the second configuration without the use of a tool external to the siphon assembly. The first pipe can be connected to an outer surface of the siphon elbow.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

FIGS. 1-5 illustrate a siphon elbow 10 that allows a siphon assembly 12 to be substantially straight and substantially rigid as the siphon assembly 12 is inserted into a rotating cylinder 14 of a steam-heated dryer 16 through an internal passageway 18 in a journal 20 of the steam-heated dryer 16. Once inside the rotating cylinder 14, a second elongated body 22 of the siphon elbow 10 pivots so that a first pipe 24 that is attached to the siphon elbow 10 can be positioned close to an inner surface 26 of the rotating cylinder 14, which allows the siphon assembly 12 to remove condensate that collects on the inner surface 26 of the rotating cylinder 14. As will be explained, the siphon elbow 10 provides an internal locking system that results in the siphon elbow 10 having a smaller diameter than was previously possible and does not require an external tool to lock the siphon elbow 10 in the pivoted or bent configuration.

Figure 1:
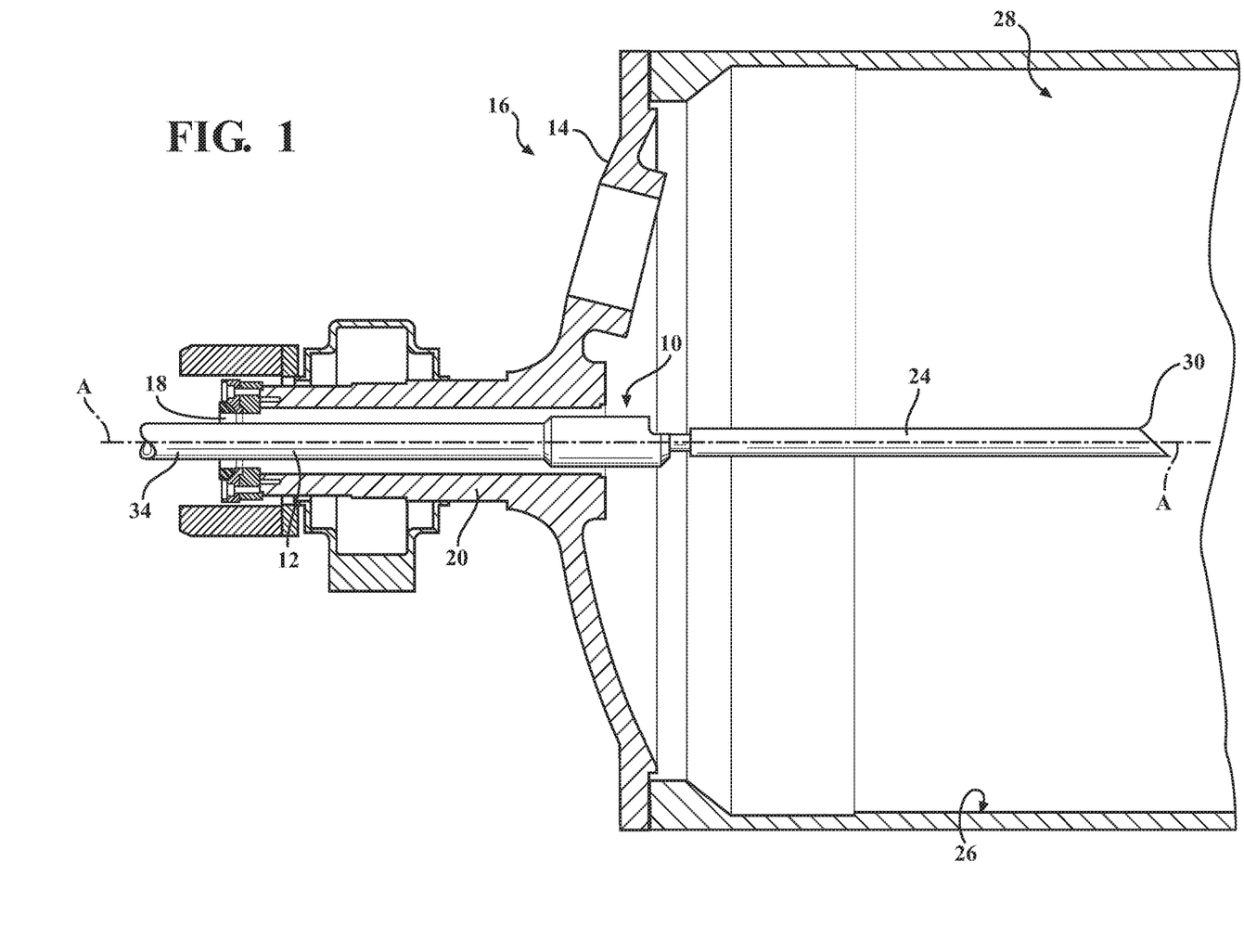
FIG. 1 is a side cut-away view of a dryer with a siphon elbow of a siphon assembly in a first configuration.
Figure 2:
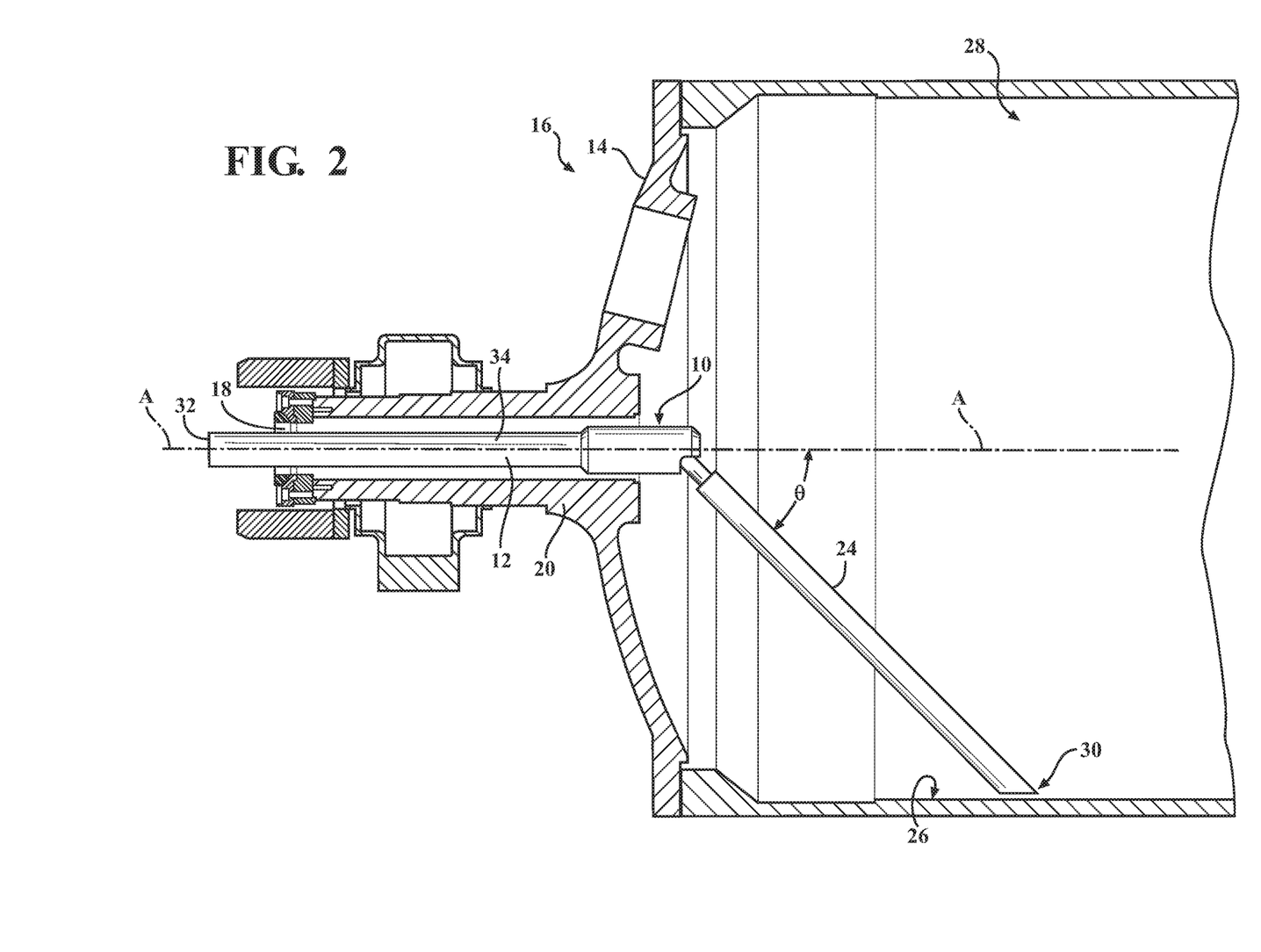
FIG. 2 is a side cut-away view of the dryer with the siphon elbow of the siphon assembly in a second configuration.

The steam-heated dryer 16 that the siphon elbow 10 is shown with in FIGS. 1-2 is typical of one used in the paper-making industry. However, the steam-heated dryer 16 is only an exemplary environment for the siphon elbow 10. It will be appreciated by those skilled in the art that the siphon elbow 10 can be used in other operational environments and in other industries.

In the illustrated, non-limiting example, the rotating cylinder 14 of the steam-heated dryer 16 includes at least one rotary joint at an end of the journal 20. The journal 20 is hollow along an axial length of the journal 20, which defines the internal passageway 18 that extends through the journal 20. The rotating cylinder 14 of the steam-heated dryer 16 defines an interior space 28 that is in communication with the internal passageway 18 of the journal 20. When the steam-heated dryer 16 is operated, the rotating cylinder 14 rotates coaxially with the axial length of the journal 20. As steam fed into the rotating cylinder 14 cools and condenses, condensate collects on the inner surface 26 of the rotating cylinder 14. The siphon assembly 12 can be used to remove this condensate.

To remove the condensate from the rotating cylinder 14 of the steam-heated dryer 16, a fluid communication channel is formed through the siphon assembly 12 that extends from a first end 30 of the first pipe 24 to a first end 32 of a second pipe 34. The first end 32 of the second pipe 34 can be fixedly or removably connected to an outlet (not shown) that accepts the condensate that has been removed from the steam-heated dryer 16. Examples of possible connections include welding or threading.

So that the siphon assembly 12 can be inserted into the interior space 28 of the rotating cylinder 14 through the internal passageway 18 of the journal 20, the siphon assembly 12 provides a first configuration, which is shown in FIG. 1. In the first configuration, the first pipe 24, the siphon elbow 10, and the second pipe 34 are coaxially aligned along axis A and extend substantially straight. Once at least the first pipe 24 is in the interior space 28 of the rotating cylinder 14 and has substantially cleared the internal passageway 18 of the journal 20, the siphon assembly 12 can transition into a second configuration, which is shown in FIG. 2. In the second configuration, the first pipe 24 is no longer coaxially aligned with the siphon elbow 10 and the second pipe 34 and is instead angled or bent away from the siphon elbow 10 so that the first end 30 of the first pipe 24 is adjacent to the inner surface 26 of the rotating cylinder 14. An angle θ formed between axis A and the first pipe 24 when the siphon assembly 12 is in the second configuration is less than 180-degrees and can be less than 90-degrees. In the illustrated, non-limiting example, the angle θ is approximately 45-degrees. The transition of the siphon assembly 12 from the first configuration into the second configuration is facilitated by the siphon elbow 10 and the weight of the first pipe 24.

Figure 3:
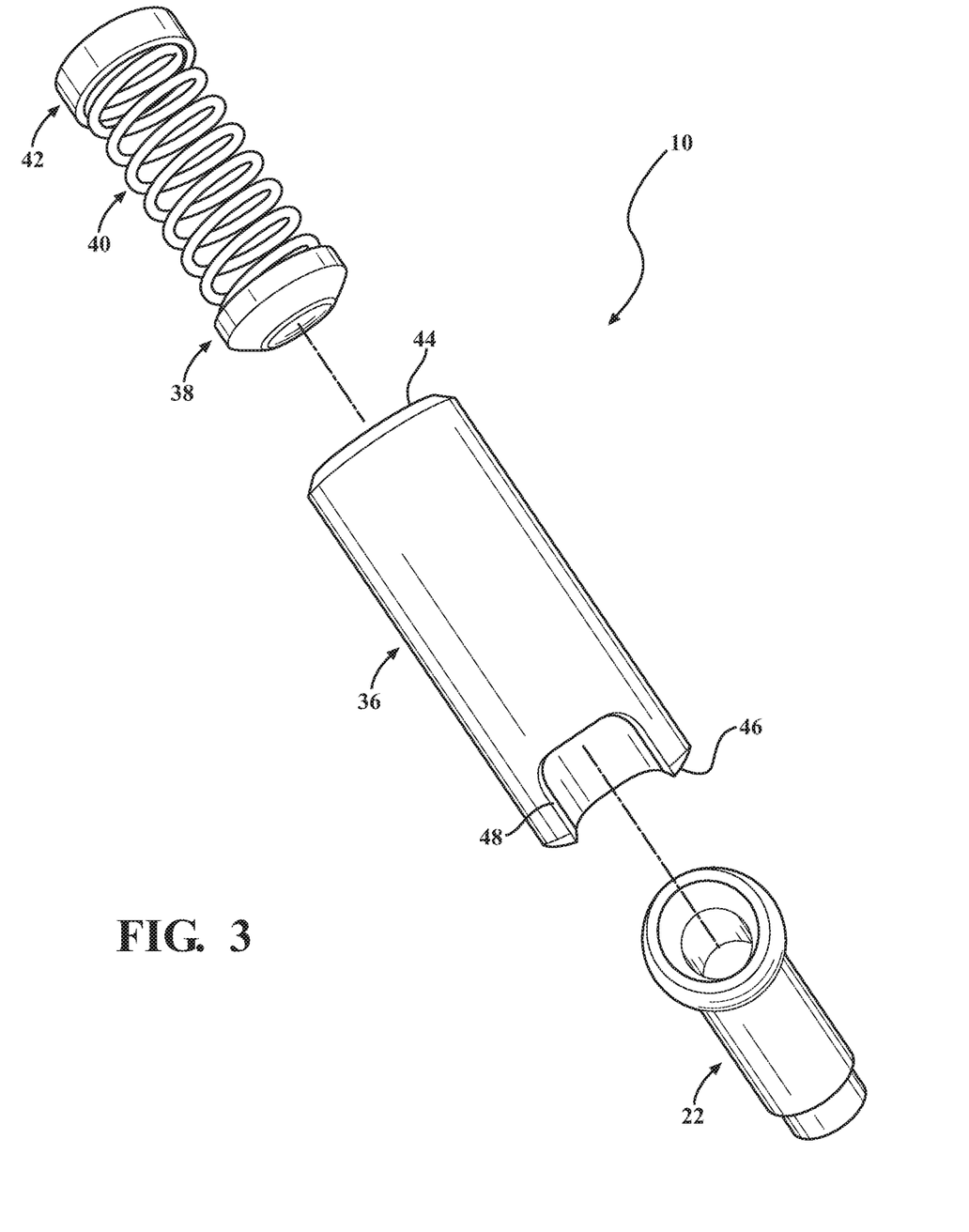
FIG. 3 is an exploded, perspective view of the siphon elbow.
Figure 4:
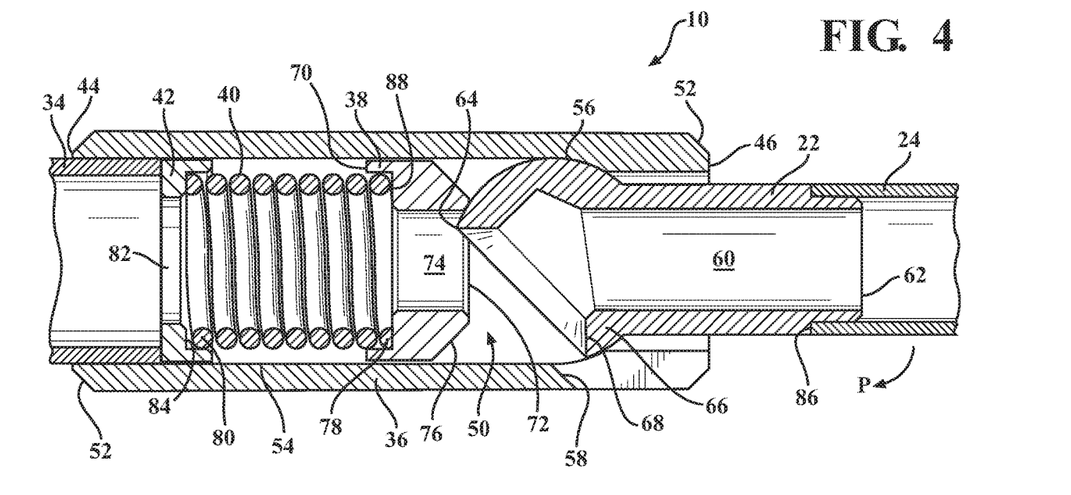
FIG. 4 is a cross-sectional view of the siphon elbow in the first configuration.
Figure 5:
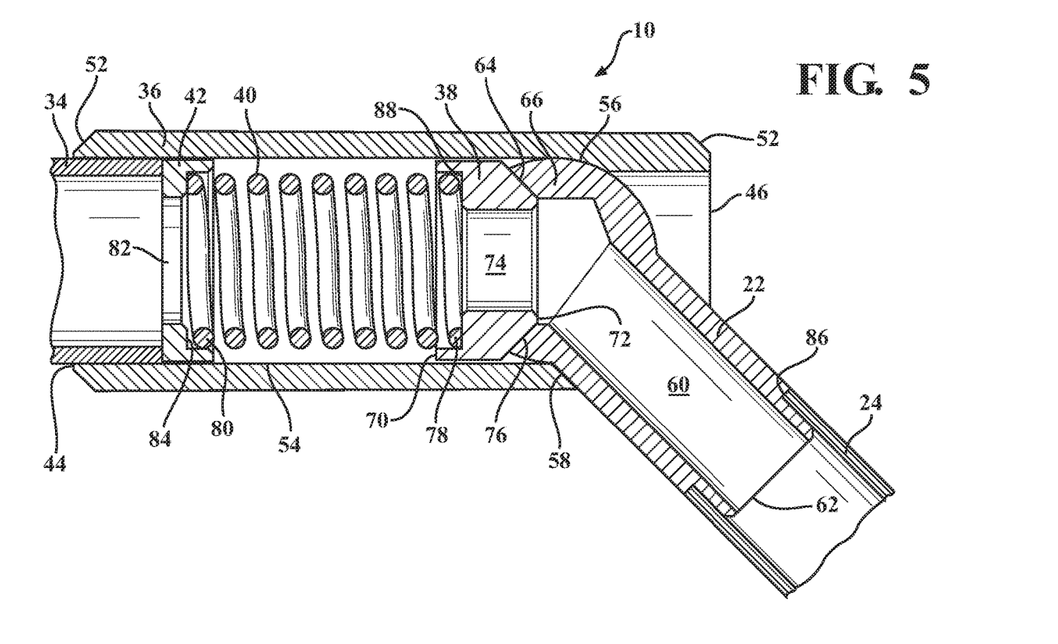
FIG. 5 is a cross-sectional view of the siphon elbow in the second configuration.

The siphon elbow 10 is shown in detail in FIGS. 3-5 and can be fabricated from any suitable material, such as stainless steel. The siphon elbow can be comprised of the second elongated body 22, a first elongated body 36, a locking retainer 38, a spring 40, and a spring seat 42. The first elongated body 36 can have a substantially cylindrical or tubular configuration with a through bore 50 extending longitudinally from a first end 44 to a second end 46 of the first elongated body 36 along axis A. Outer surfaces of the first end 44 and the second end 46 of the first elongated body 36 can be provided with chamfers 52. The second pipe 34 can be fixedly or removably connected to the first end 44 of the first elongated body 36 with fluid communication established with the through bore 50 of the first elongated body 36 and the second pipe 34.

To assist with automatically locking the siphon elbow 10 in the second configuration without the use of an external tool, an inner surface 54 of the first elongated body 36 can be provided with a partially spherical indentation 56 that is formed closer to the second end 46 than the first end 44 of the first elongated body 36. The partially spherical indentation 56 can be formed as an arcuate transition between two portions of the first elongated body 36 having different thicknesses. In the illustrated, non-limiting example, the thickness of the portion of the first elongated body 36 that includes the first end 44 is less than the thickness of the portion of the first elongated body 36 that includes the second end 46. This results in the partially spherical indentation 56 being the arcuate transition between the two portions.

So that the first pipe 24 can pivot relative to the second pipe 34, a recess 48 can be formed in the first elongated body 36 along the second end 46. In the illustrated, non-limiting example, the recess 48 has a substantially U-shaped configuration with a chamfer 58 along a bottom edge that is opposite the second end 46 of the first elongated body 36. The recess 48 can be in fluid communication with the through bore 50 that extends through the first elongated body 36.

The second elongated body 22 can have a substantially cylindrical or tubular configuration with a through bore 60 extending from a first end 62 to a second end 64 of the second elongated body 22. The first end 62 of the second elongated body 22 can be provided with a shoulder 86 that the first pipe 24 can rest against when the first pipe 24 is fixedly or removably connected to the second elongated body 22 of the siphon elbow 10. When the first pipe 24 is connected to the first end 62 of the second elongated body 22, the second elongated body 22 and the first pipe 24 can be coaxially aligned, and fluid communication is established between the through bore 60 of the second elongated body 22, the first pipe 24, and the through bore 50 of the first elongated body 36.

To allow the second elongated body 22 to pivot relative to the first elongated body 36, the second end 64 of the second elongated body 22 can be provided with a generally spherical extension 66 that is complementary to the partially spherical indentation 56 of the first elongated body 36. The generally spherical extension 66 can be integrally formed with the second elongated body 22. The generally spherical extension 66 of the second elongated body 22 can have a diameter that is slightly smaller than a diameter of the partially spherical indentation 56 of the first elongated body 36. Because the through bore 60 extends through the generally spherical extension 66, the generally spherical extension 66 can be hollow. Where the through bore 60 opens on the second end 64 of the second elongated body 22, the generally spherical extension 66 can have a chamfer 68 extending along the circumference of the generally spherical extension 66. The chamfer 68 can have a substantially frusto-conical configuration.

The locking retainer 38 can have a substantially cylindrical or tubular configuration with a through bore 74 extending from a first end 70 to a second end 72 of the locking retainer 38. The locking retainer 38 can have a shoulder 88 formed in the through bore 74 that allows a first end 78 of the spring 40 to bias the locking retainer 38 toward the second elongated body 22. Use of the shoulder 88 can result in the through bore 74 having two different diameters. In the illustrated, non-limiting example, the diameter of the through bore 74 at the first end 70 of the locking retainer 38 is greater than the diameter of the through bore 74 at the second end 72 of the locking retainer 38. To assist with locking the second elongated body 22 in the second configuration, the second end 72 of the locking retainer 38 can be provided with a chamfer 76 along the circumference of the second end 72 that matingly and/or complementarily engages the chamfer 68 of the second elongated body 22 when the siphon elbow 10 is in the second configuration. For example, the chamfer 76 of the locking retainer 38 can have a substantially frusto-conical configuration that is opposite the frusto-conical configuration of the chamfer 68 of the second elongated body 22.

To assist with the biasing of the locking retainer 38 toward the second elongated body 22, the siphon elbow 10 can be provided with the spring seat 42, which can be positioned within the through bore 50 of the first elongated body 36 between the second pipe 34 and the spring 40. A through bore 82 can extend through the spring seat 42 so that fluid communication can be maintained between the through bore 50 of the first elongated body 36 and the second pipe 34. An outer diameter of the spring seat 42 can be slightly smaller than a diameter of the through bore 50 of the first elongated body 36. The spring seat 42 can have a shoulder 84 formed in the through bore 82 that a second end 80 of the spring 40 compresses against. If the locking retainer 38 is omitted, the second end 80 of the spring 40 can compress against an end of the second pipe 34.

The siphon assembly 12 is installed into the rotating cylinder 14 of the steam-heated dryer 16 by inserting the first end of the first pipe 24 through the internal passageway 18 of the journal 20 when the siphon assembly 12 is in the first configuration. As shown in FIG. 1, the recess 48 in the first elongated body 36 can be positioned upward so that the second elongated body 22 rests substantially horizontal against the first elongated body 36 with the generally spherical extension 66 of the second elongated body 22 flush against the partially spherical indentation 56 of the first elongated body 36. Once the siphon assembly 12 is fed far enough into the rotating cylinder 14 of the steam-heated dryer 16 that the first pipe 24 has cleared the internal passageway 18 of the journal 20, the siphon assembly 12 is slowly rotated about axis A until the recess 48 in the first elongated body 36 is positioned downward. This allows gravity to pull the first pipe 24 downward toward the inner surface 26 of the rotating cylinder 14 by pivoting along path P, which is substantially perpendicular to axis A.

As the first pipe 24 pivots downward along path P, the generally spherical extension 66 of the second elongated body 22 slides or pivots along the partially spherical indentation 56 of the first elongated body 36 and the chamfer 68 of the second elongated body 22 slides along the chamfer 76 of the locking retainer 38. Once the second elongated body 22 rests against the chamfer 58 of the first elongated body 36 as illustrated in FIG. 5, the biasing force of the spring 40 automatically locks the chamfer 76 of the locking retainer 38 into the chamfer 68 of the second elongated body 22 and the weight of the first pipe 24 assists with keeping the siphon elbow 10 in the second configuration. As a result, the siphon elbow 10 is locked in the second configuration without the use of an external tool.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A siphon elbow for pivotally connecting a first pipe and a second pipe in fluid communication, the siphon elbow comprising:
    a first elongated body having a bore extending therethrough, wherein an inner surface defines the bore of the first elongated body and a portion of the inner surface has a partially spherical indentation;
    a second elongated body having a bore extending therethrough and a generally spherical extension including a first chamfer extending along a circumference of the generally spherical extension, the spherical extension pivotably engaging the portion of the inner surface of the first elongated body having the partially spherical indentation; and
    an internal locking system including a second chamfer extending along a circumference thereof corresponding in configuration to the first chamfer, the internal locking system being disposed in at least one of the bore of the first elongated body or the bore of the second elongated body, wherein the internal locking system locks the second elongated body into an operating configuration in which an angle formed between the first elongated body and the second elongated body is less than 180-degrees,
    wherein pivoting of the second elongated body from an installation configuration in which the angle is approximately 180-degrees to the operating configuration activates the internal locking system to cause contact between the first and second chamfers to thereby lock the second elongated body in the operating configuration.

2. The siphon elbow of claim 1, further comprising:
    the first pipe, wherein the second elongated body and the generally spherical extension are integrally formed and the first pipe is connected to an outer surface of the second elongated body.

3. The siphon elbow of claim 2, wherein the first pipe rests against a shoulder formed in the outer surface of the second elongated body opposite the generally spherical extension.

4. The siphon elbow of claim 1, wherein the second elongated body rests within a recess is formed along an end of the first elongated body when the second elongated body is locked in the operating configuration.

5. The siphon elbow of claim 1, the internal locking system comprising:
    a locking retainer having a bore extending therethrough and a first end configured to matingly engage the first end of the second elongated body.

6. The siphon elbow of claim 5, wherein a fluid communication channel is formed through the first pipe, the first elongated body, the second elongated body, the locking retainer, and the second pipe.

7. The siphon elbow of claim 5, the internal locking system further comprising:
    a spring that biases the locking retainer toward the second elongated body.

8. The siphon elbow of claim 7, wherein a first end of the spring engages a shoulder formed along the bore of the locking retainer.

9. The siphon elbow of claim 8, the internal locking system further comprising:
    a spring seat having a bore extending therethrough and a shoulder formed along the bore, wherein a second end of the spring engages the shoulder of the spring seat.

10. The siphon elbow of claim 9, wherein the spring seat, the spring, and the locking retainer are disposed within the bore of the first elongated body.

11. The siphon elbow of claim 10, wherein a fluid communication channel is formed through the first pipe, the first elongated body, the second elongated body, the locking retainer, the spring, the spring seat, and the second pipe.

12. The siphon elbow of claim 5, wherein the first end of the locking retainer includes the second chamfer.

13. The siphon elbow of claim 12, wherein the first end of the second elongated body includes the first chamfer.

14. The siphon elbow of claim 1, wherein the internal locking system locks the second elongated body into the operating configuration without use of a tool external to the siphon elbow, the first pipe, and the second pipe.

15. A siphon elbow for pivotally connecting a first pipe and a second pipe in fluid communication, the siphon elbow comprising:
    a first elongated body having a bore extending therethrough and a recess formed along an end of the first elongated body, wherein an inner surface defines the bore of the first elongated body and a portion of the inner surface has a partially spherical indentation;
    a second elongated body having a bore extending therethrough and a generally spherical extension including a first chamfer on a first end of the generally spherical extension, the generally spherical extension pivotally engaging the portion of the inner surface of the first elongated body having the partially spherical indentation, wherein the second elongated body pivots into the recess of the first elongated body in a locked configuration, where the first pipe is angled relative to the second pipe;
    a locking retainer within the first elongated body that has a first end with a second chamfer configured to matingly engage the first chamfer, the locking retainer including a bore extending therethrough; and
    a spring within the first elongated body that biases the locking retainer toward the second elongated body such that the first and second chamfers are forced into mating engagement whereby the spring and the locking retainer cooperate to lock the second elongated body in the locked configuration once the siphon elbow has pivoted from a substantially straight configuration into the locked configuration.

16. The siphon elbow of claim 15, further comprising:
    the first pipe, wherein the second elongated body and the generally spherical extension are integrally formed and the first pipe is connected to an outer surface of the second elongated body opposite the generally spherical extension.

17. The siphon elbow of claim 15, wherein the first chamfer and the second chamfer each include a substantially frusto-conical configuration such that the first chamfer is slidable along the second chamfer.

18. A method of installing a siphon assembly into a cylinder through an internal passageway, the method comprising:
  providing the siphon assembly with a first pipe and a second pipe connected to and in fluid communication with a siphon elbow, wherein the siphon elbow has a first configuration, where the siphon assembly is substantially straight, and a second configuration, where the siphon assembly is bent;
  inserting the siphon assembly in the first configuration into the cylinder through the internal passageway until at least the first pipe has cleared the internal passageway and the second pipe is at least partially within the internal passageway; and
  rotating the siphon assembly until the first pipe moves into the second configuration, wherein an internal locking system within the siphon elbow locks the siphon elbow into the second configuration once the siphon elbow transitions into the second configuration from the first configuration by forcing corresponding chamfered surfaces included on the siphon elbow and the internal locking system into mating engagement.

19. The method of claim 18, wherein the internal locking system locks the siphon elbow into the second configuration without use of a tool external to the siphon assembly.

20. The method of claim 18, wherein the first pipe is connected to an outer surface of the siphon elbow.

* * * * *